JOHN STOTT.
Improvement in Rotary Engines.

No. 119,797.  Patented Oct. 10, 1871.

Witnesses:
Gustave Dieterich
Francis McArdle

Inventor:
John Stott
Per Munn & Co.
Attorneys.

N° 119,797

UNITED STATES PATENT OFFICE.

JOHN STOTT, OF BURLINGTON, IOWA.

IMPROVEMENT IN ROTARY ENGINES.

Specification forming part of Letters Patent No. 119,797, dated October 10, 1871.

*To all whom it may concern:*

Be it known that I, JOHN STOTT, of Burlington, in the county of Des Moines and State of Iowa, have invented a new and useful Improvement in Rotary Engines; and I do hereby declare that the following is a full, clear, and exact description thereof, which will enable others skilled in the art to make and use the same, reference being had to the accompanying drawing forming part of this specification.

My invention consists in the improvement of rotary steam-engines, as hereinafter fully described and subsequently pointed out in the claim.

Figure 1:
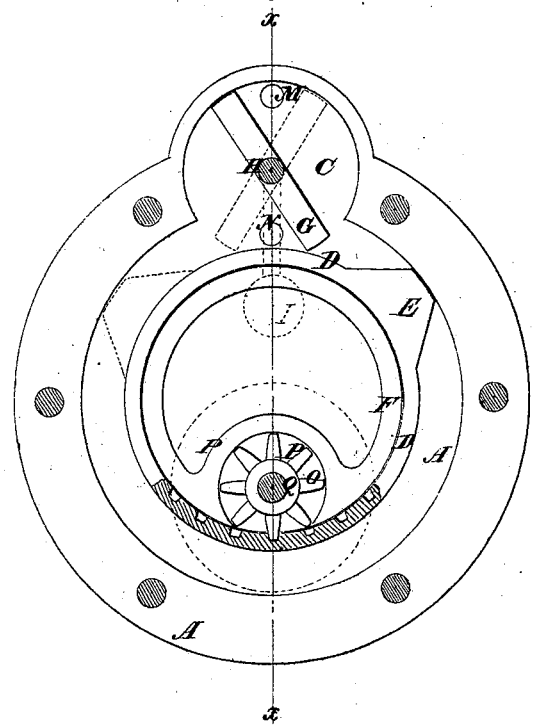
Figure 2:
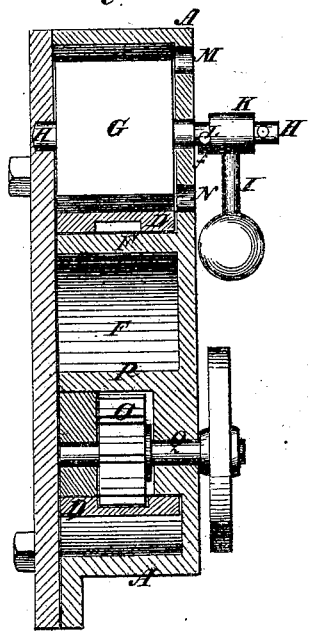

Figure 1 is a side elevation of the engine with one side of the case removed, and Fig. 2 is a sectional elevation taken on the line $x\,x$ of Fig. 1.

A is a hollow cylinder for a rotary piston, B, and C is a secondary cylinder above it for the valve or steam-gate, the said secondary cylinder opening at the bottom into the top of the larger one, so that the circumferential line of the interior will extend as low or a little lower than the top of the ring D, to which the piston E is attached. Said ring works on a hub or fixed ring, F, within the steam-cylinder. G is the valve or steam-gate, mounted on an axis, H, in the cylinder C, and fitted in it to work steam-tight, but so that it can be turned readily. The shaft H extends through the case and is provided with a weighted arm, I, to hold it either in the position shown in black lines or the one indicated in dotted lines, according to which way it is designed to have the engine run. The said weighted arm is connected to the shaft H by a tube, K, capable of turning freely on it, and having a shoulder, J, which, bearing on a pin, L, will hold the valve in the position shown. It also has another shoulder, which, coming against said pin when the arm is shifted on the axle, will hold the valve in the position indicated by the dotted lines. This valve, being thus mounted, is subjected to equal pressure on both sides of the axis, and is held in position by the weight, so that when the piston comes under the end bearing on the ring, it will rise and let the piston pass and then fall back again. M is the live-steam port, and N the exhaust. The steam acts upon the piston very nearly throughout the whole revolution, escaping only at about the moment the piston has passed sufficiently beyond the gate to take steam again, so that there is a very uniform application of power, and no appreciable "dead-point." I propose to employ this valve or gate with reciprocating engines also; but in this case it will be provided with means for shifting it to reverse the application of the steam at each half-stroke of the piston. It may also be worked in this way in connection with this engine, imparting an oscillating motion to the piston, which will, by an arm and connecting-rod, give reciprocating motion; or the rod may be connected to a crank on a shaft having a heavy fly-wheel to carry it past the dead-centers, and thus give rotary motion. I propose to transmit the motion of the piston E through the medium of the ring D, having teeth on its inner face, and gearing with a pinion, O, working in a cavity, P, in the hub F, gearing with said teeth, and having a shaft, Q, extending one side of the case. This engine is also useful as a rotary pump.

Having thus described my invention, I claim as new and desire to secure by Letters Patent—

1. The combination of the piston E, toothed ring D, hub F, and the pinion O, substantially as specified.

2. The steam-gate G, swinging on its center within steam-chest C, in combination with weighted arm I, thereby dividing the pressure of steam and lessening the friction on the piston.

JOHN STOTT.

Witnesses:
S. B. FAIRBANK,
H. A. GATES. (150)